United States Patent
Asthana et al.

(10) Patent No.: US 10,990,995 B2
(45) Date of Patent: Apr. 27, 2021

(54) SYSTEM FOR COGNITIVE ASSESSMENT OF TRANSACTIONS

(71) Applicant: INTERNATIONAL BUSINESS MACHINES CORPORATION, Armonk, NY (US)

(72) Inventors: Shubhi Asthana, Santa Clara, CA (US); Kugamoorthy Gajananan, Toshima-ku (JP); Aly Megahed, San Jose, CA (US); Hamid Reza Motahari Nezhad, San Jose, CA (US); Taiga Nakamura, Sunnyvale, CA (US); Mark Andrew Smith, Leicestershire (GB); Peifeng Yin, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 242 days.

(21) Appl. No.: 16/131,993

(22) Filed: Sep. 14, 2018

(65) Prior Publication Data
US 2020/0090202 A1    Mar. 19, 2020

(51) Int. Cl.
*G06Q 30/02* (2012.01)
*G06N 20/00* (2019.01)

(52) U.S. Cl.
CPC ......... *G06Q 30/0211* (2013.01); *G06N 20/00* (2019.01)

(58) Field of Classification Search
CPC .................................................... G06Q 30/02
See application file for complete search history.

(56) References Cited

U.S. PATENT DOCUMENTS

| | | | | |
|---|---|---|---|---|
| 7,974,863 B2 * | 7/2011 | Etzioni | ............... | G06Q 10/02 705/5 |
| 10,248,974 B2 * | 4/2019 | Firth | ............... | G06Q 30/0275 |

(Continued)

FOREIGN PATENT DOCUMENTS

| | | | | |
|---|---|---|---|---|
| IN | 3643/MUM/2011 | * | 6/2013 | ............... G06F 7/08 |
| WO | 2015103263 A1 | | 7/2015 | |

OTHER PUBLICATIONS

Kugamoorthy Gajananan; Aly Megahed; Mad Abe; Taina Nakamura; Mark Smith, A Top-Down Pricing Algorithm for IT Service Contracts Using Lower Level Service Data (English), 2016 IEEE International Conference on Services Computing (SCC)(pp. 720-727), Jun. 1, 2016 (Year: 2016).*

(Continued)

*Primary Examiner* — Marilyn G Macasiano
(74) *Attorney, Agent, or Firm* — Zilka-Kotab, P.C.

(57) ABSTRACT

A system for cognitive assessment of the competitiveness of deals may include a memory having stored thereon historical deal information for historical deals with each historical deal including a historical deal component. A historical deal component may include a historical work scope and associated historical work pricing. The system may also include a processor cooperating with the memory and configured to compare current deal information with the historical deal information. The current deal information may include a current deal component that may include a current work scope and associated current work pricing. The processor may use machine learning to determine whether the current deal component is non-competitive based upon the historical deal information, and for each non-competitive current deal component generate an alternative current deal component. The alternative current deal component may have at least (Continued)

one of a different current work scope and different associated current work pricing.

20 Claims, 4 Drawing Sheets

(56) References Cited

U.S. PATENT DOCUMENTS

| | | | |
|---|---|---|---|
| 2008/0228658 A1* | 9/2008 | Crean | G06Q 30/02 705/80 |
| 2011/0191230 A1 | 8/2011 | Avery | |
| 2012/0041816 A1 | 2/2012 | Buchalter | |
| 2013/0006738 A1 | 1/2013 | Horvitz et al. | |
| 2013/0166355 A1* | 6/2013 | Mohanty | G06Q 30/0283 705/7.35 |
| 2014/0040004 A1* | 2/2014 | Hamo | G06Q 30/06 705/14.35 |
| 2015/0363842 A1 | 12/2015 | Hoyne | |
| 2016/0350680 A1* | 12/2016 | Sweeney | G06Q 30/0643 |
| 2017/0032400 A1 | 2/2017 | Gilmore et al. | |
| 2017/0032456 A1 | 2/2017 | Strauss et al. | |
| 2017/0178168 A1 | 6/2017 | Fukuda et al. | |
| 2017/0243268 A1 | 8/2017 | Fukuda et al. | |
| 2017/0372341 A1 | 12/2017 | Fukuda et al. | |
| 2017/0372349 A1 | 12/2017 | Fukuda et al. | |
| 2017/0372378 A1 | 12/2017 | Firth et al. | |

OTHER PUBLICATIONS

Ahmad et al. "Study on brand competitiveness and customer purchase intention"; Entrepreneurship Vision 2020: Innovation, Development Sustainability, and Economic Growth; (2013); pp. 109-113.

Megahed et al.; "Top-Down Pricing of It Services Deals with Recommendation for Missing Values of Historical and Market Data"; In Proceedings of the International Conference on Service-Oriented Computing (ICSOC), pp. 745-760, 2016.

Asthana et al.; "A Cognitive Prioritization for Reports Generated in Resource Constrained Applications;" 2017 IEEE 14th International Conference on Services Computing; 2017; pp. 418-425.

Megahed et al.; "A Method for Selecting Peer Deals in It Service Contracts;" 2017 IEEE 6th International Conference on AI & Mobile Services; 2017; pp. 1-7.

Kugamoorthy et al.; "A Top-Down Pricing Algorithm for IT Service Contracts Using Lower Level Service Data;" 2016 IEEE International Conference on Services Computing; 2016, pp. 720-727.

Megahed et al.; "Pricing IT Services Deals: A More Agile Top-Down Approach;" In Proceedings of the International Conference on Service-Oriented Computing (ICSPC), pp. 461-473, 2015.

Kugamoorthy et al.; "A Method for Estimating Annual Cost Reduction of IT Service Deals;" 2017 IEEE International Conference on Service Operations and Logistics, and Informatics; Sep. 18-20, 2017; Bari, Italy; pp. 45-50.

Akkiraju et al.; "On Pricing Complex IT Service Solutions;" 2014 SRII Global Conference; IEEE 2014; pp. 55-64.

Akkiraju et al.; "On Assessing the Competitiveness of IT Service Solutions;" 2013 IEEE 10th International Conference on Services Computing; 2013; pp. 771-772.

Akkiraju et al.; "On the Role of Analytics in Estimating the Cost of Delivering Complex Information Technology (IT) Outsourcing Services Projects;" 2012 Service Research and Innovation Institute Global Conference; IEEE 2012; pp. 705-714.

Abe et al.; "Pricing IT Service Deals: A More Agile Top-Down Approach". In Proceedings of the International Conference on Service-Oriented Computing (ICSOC), pp.. 461-473, 2015; published in 2016 by Information Processing Society of Japan.

Asthana et al; "Selecting Peer Deals for Information Technology (IT) Service Deals;" U.S. Appl. No. 15/860,192, filed Jan. 2, 2018.

Kugamoorthy et al.; "Estimating Annual Cost Reduction When Pricing Information Technology (IT) Service Deals;" U.S. Appl. No. 15/860,213, filed Jan. 2, 2018.

Kugamoorthy Gajananan, Mari Abe, Aly Megahed and Taiga Nakamura. "Estimating Competitive Prices of Services in Information Technology Service Deals based on Empirical Data". In Multimedia, Distributed, Cooperative, and Mobile Symposium (DICOMO), 2015. (No English Translation Available).

* cited by examiner

SYSTEM FOR COGNITIVE ASSESSMENT OF TRANSACTIONS

BACKGROUND

The present invention relates to determining probabilities, and more specifically, to a system for determining competitive assessment of deals and related methods. Service competitors, for example, information technology (IT) service competitors may compete to win highly-valued IT service contracts in a competitive tender-like kind of process. These deals may include services/components like cloud computing, mainframe, Unix, mobile, etc. Each provider may prepare a solution or proposal that may include multiple components, take it to a potential client and negotiate with the potential client trying to convince the potential client to accept their solution or proposal to take their solution.

Using pricing methods, different deal components can be priced reaching an overall price for the deal, to be negotiated with the client. However, providers typically face a situation where parts of the solution turn out to not be competitive.

SUMMARY

A system for cognitive assessment of the competitiveness of deals may include a memory having stored thereon historical deal information for a plurality of historical deals with each historical deal including at least one historical deal component, the at least one historical deal component including a historical work scope and associated historical work pricing. The system may also include a processor cooperating with the memory and configured to compare current deal information with the historical deal information. The current deal information may include at least one current deal component that may include a current work scope and associated current work pricing. The processor may also be configured to use machine learning to determine whether the at least one current deal component is non-competitive based upon the historical deal information, and for a non-competitive current deal component generate an alternative current deal component. The alternative current deal component may have at least one of a different current work scope and different associated current work pricing.

The at least one historical deal component may include a plurality of historical deal components, and at least one current deal component may include a plurality of current deal components. The processor may be configured to use machine learning with a machine learning classifier, for example. The historical information for each historical deal further may include at least one historical deal attribute, and the current deal information may also include at least one current deal attribute, for example.

The at least one historical deal attribute may include at least one of a historical deal geographic location, a historic deal time, historical deal client metadata, and historical deal competitor metadata, and the at least one current deal attribute may include at least one of a current deal geographic location, a current deal time, current deal client metadata, and current deal competitor metadata The processor may be configured to use machine learning to first attempt a lowered current work pricing for the alternative current deal component prior to attempting a reduced current work scope for the alternative current deal component, for example.

The processor may be configured to compare the current work pricing to a pricing threshold. The alternative current deal component may include a deleted current deal component, for example.

The processor may be configured to determine the alternative deal component also based upon an optimization model. The optimization model may be based upon a constraint for not including the non-competitive deal component. The optimization model may be configured to determine a lowest value alternative deal component, for example.

The processor may be configured to use machine learning to generate the alternative current deal component. The historical and current deal information may include respective historical and current information technology (IT) service contract information, for example.

A method aspect is directed to a method for cognitive assessment of the competitiveness of deals. The method may include using a processor and associated memory to compare current deal information with historical deal information. The historical deal information may be for a plurality of historical deals with each historical deal comprising at least one historical deal component. The at least one historical deal component may include a historical work scope and associated historical work pricing. The current deal information may include at least one current deal component that may include a current work scope and associated current work pricing. The method may further include using the processor to use machine learning to determine whether the at least one current deal component is non-competitive based upon the historical deal information, and for a non-competitive current deal component generate an alternative current deal component. The alternative current deal component may have at least one of a different current work scope and different associated current work pricing.

A computer readable medium aspect is directed to a computer readable medium for cognitive assessment of the competitiveness of deals. The computer readable medium includes computer executable instructions that when executed by a processor cause the processor to perform operations. The operations may include comparing current deal information with the historical deal information. The historical deal information may be for a plurality of historical deals with each historical deal including at least one historical deal component. The at least one historical deal component may include a historical work scope and associated historical work pricing. The current deal information may include at least one current deal component that may include a current work scope and associated current work pricing. The operations may also include using machine learning to determine whether the at least one current deal component is non-competitive based upon the historical deal information, and for a non-competitive current deal component generating an alternative current deal component. The alternative current deal component may have at least one of a different current work scope and different associated current work pricing.

DETAILED DESCRIPTION

Figure 1:
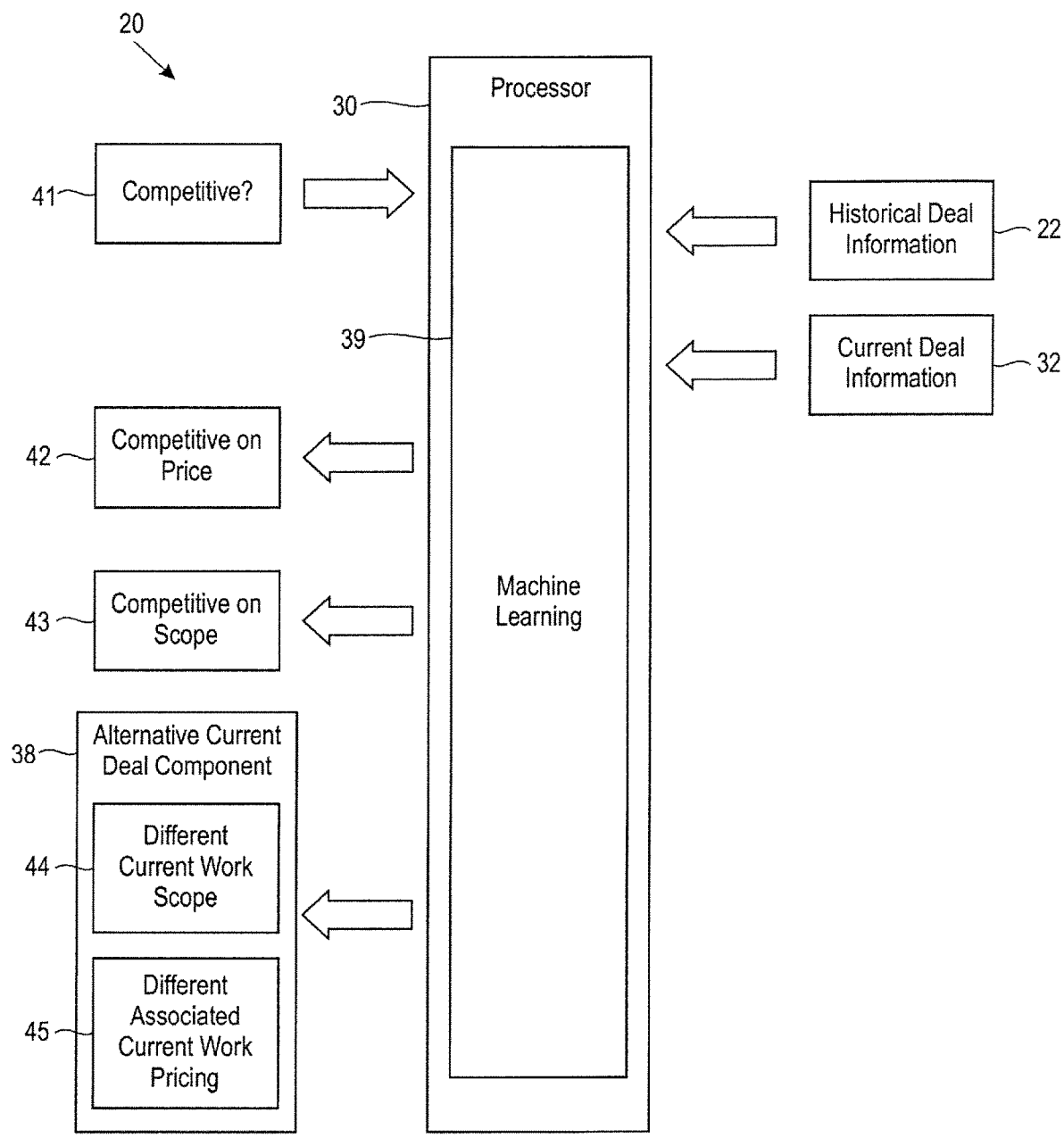
FIG. 1 is a schematic diagram of a system for cognitive assessment of the competitiveness of deals in accordance with an embodiment.
Figure 2:
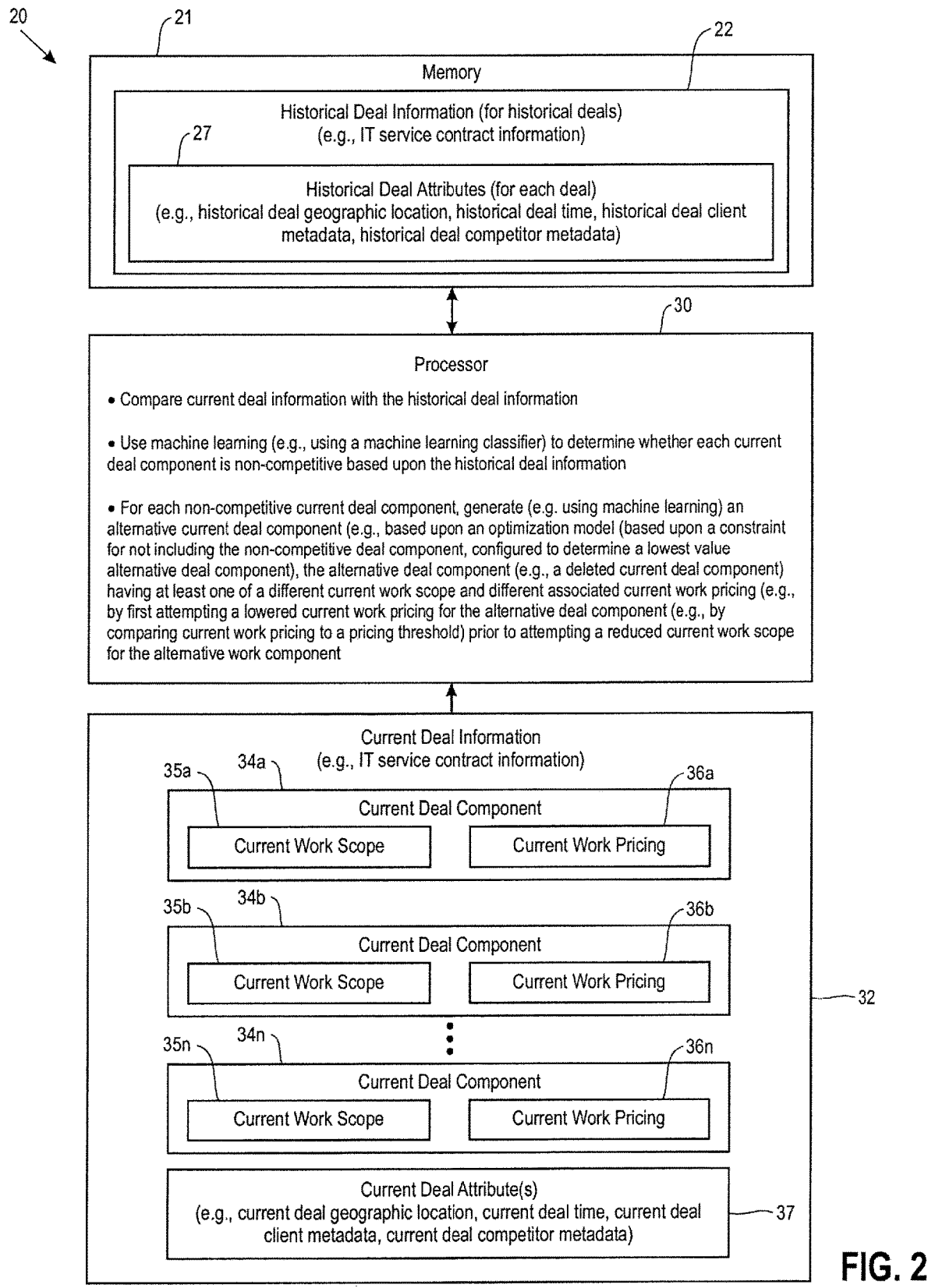
FIG. 2 is another schematic diagram of a system for cognitive assessment of the competitiveness of deals in accordance with an embodiment.
Figure 3:
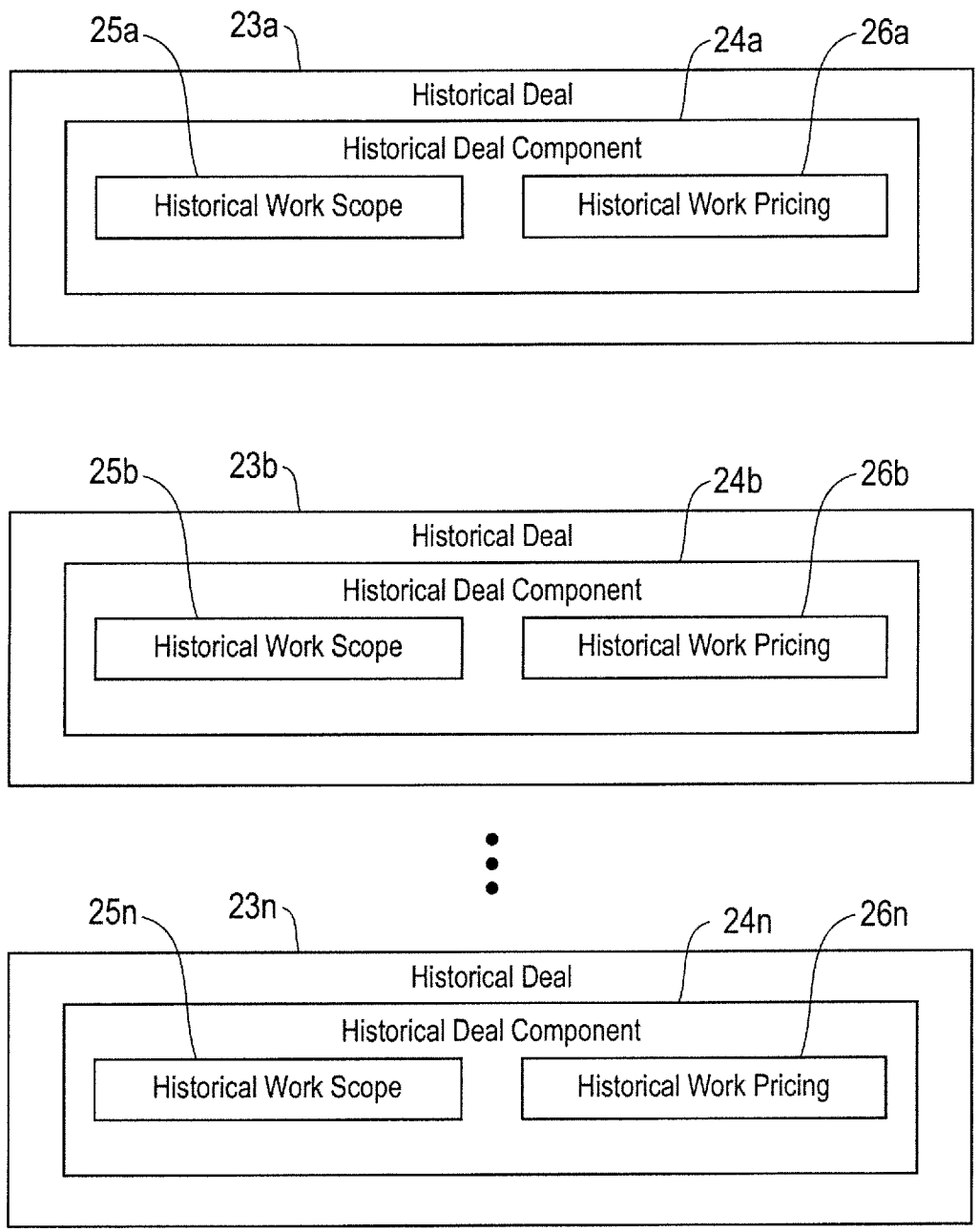
FIG. 3 is a diagram illustrating historical deals and included deal components for use with the system for cognitive assessment of the competitiveness of deals of FIG. 1.

Referring initially to FIGS. 1-3, a system 20 for cognitive assessment of the competitiveness of deals includes a memory 21 having stored thereon historical deal information 22 (e.g., historical IT service contract information) for historical deals 23a-23n with each historical deal including historical deal components 24a-24n, and each historical deal component including a historical work scope 25a-25n and associated historical work pricing 26a-26n. The historical deal information 22 for each historical deal 23a-23n may also include one or more deal attributes 27, for example, historical deal geographic location, historical deal time, historical deal client metadata, and historical deal competitor metadata. The system 20 also includes a processor 30 cooperating with the memory 21.

As will be appreciated by those skilled in the art, a user may wish to determine whether a deal currently being bid, processed, or put together for a client is competitive 41 (e.g., priced correctly for the corresponding scope and relative to past deals and competitors). As will be described in further detail below, the system 20 will let the user know whether the proposed deal is competitive on price 42, competitive on scope 43, and, based upon whether the proposed deal is competitive, generate an alternative current deal component 38.

Figure 4:
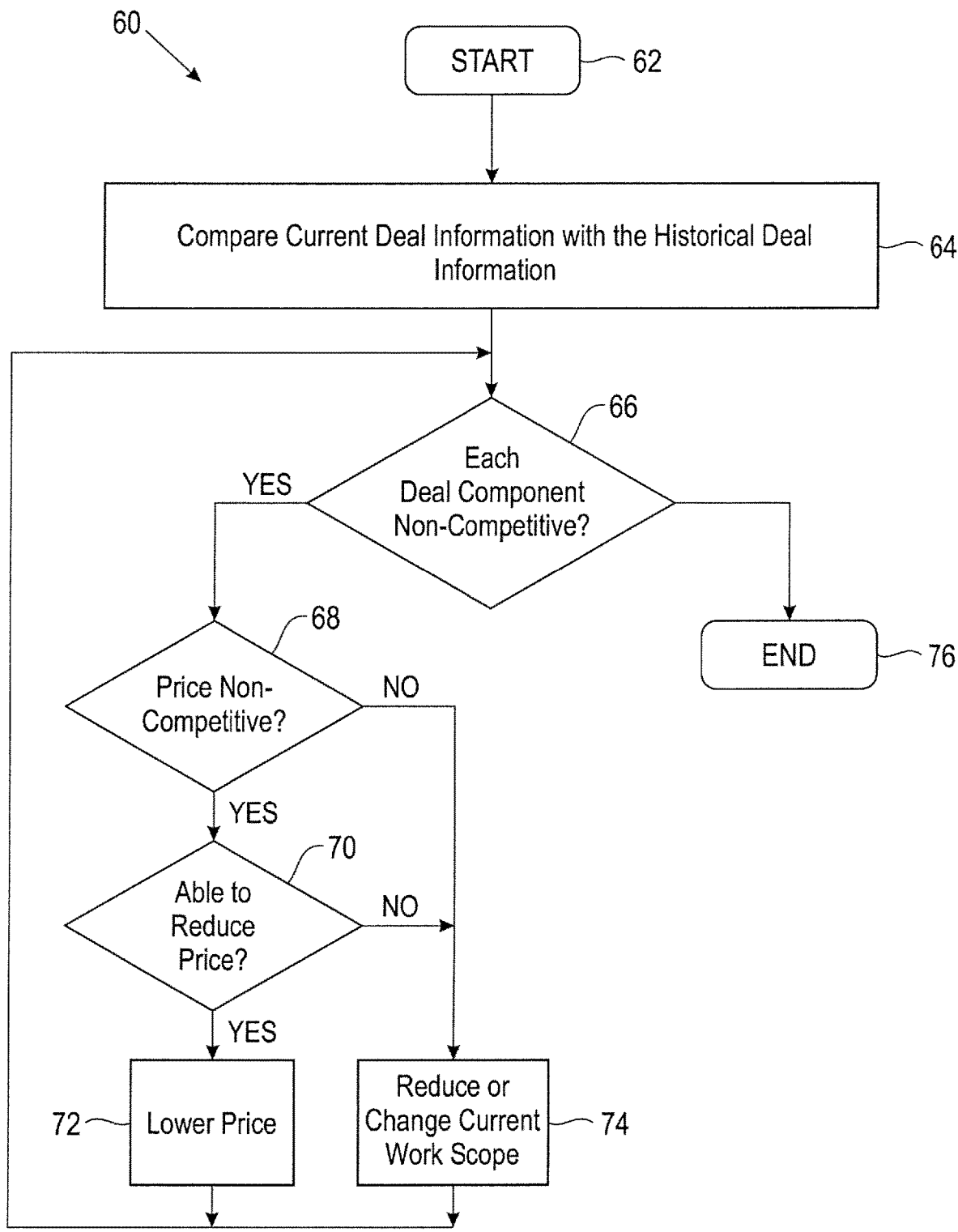
FIG. 4 is a flowchart of operation of a system for cognitive assessment of the competitiveness of deals in accordance with an embodiment.

Referring now additionally to the flowchart 60 in FIG. 4, beginning at Block 62, the processor 30 compares current deal information 32 (e.g., current IT service contract information) with the historical deal information 22 (Block 64). The current deal information 32 includes current deal components 34a-34n with each current deal component that includes a current work scope 35a-35n and associated current work pricing 36a-36n. Similar to the historical deal information 22, the current deal information 32 may include one or more current deal attributes 37. The processor, at Block 66, uses machine learning 39, for example, a machine learning classifier, to determine whether each current deal component 34a-34n is non-competitive based upon the historical deal information, and for each non-competitive current deal component generates, for example, based upon an optimization model, an alternative current deal component 38 before ending at Block 76. The alternative current deal component 38 has at least one of a different current work scope 44 and different associated current work pricing 45, and may include a deleted current deal component 34a-34n. More particularly, the processor 30 may use machine learning 39 to first attempt a lowered current work pricing 36a-36n for the alternative current deal component 38 by first determining at Block 68 whether the price is non-competitive (e.g., by comparing the current work pricing to a threshold). When the price is non-competitive, the processor 30 determines whether the price can be reduced (Block 70), and if so, lowering the price (Block 72). The price reducing (Blocks 68-72) is performed prior to attempting a reduced current work scope 35a-35n (e.g., deleting a current deal component) for the alternative current deal component 38 (Block 74). If, at Block 66, each current deal component 34a-34n is competitive, the method ends at Block 76. While historical and current deal components 24a-24n, 34a-34n are described herein, it should be understood that there may be a single historical and current deal component. The process is repeated (by returning to Block 66) until each deal component is competitive.

Further details of the system 20 will now be described. In particular, further details of the prediction of parts of the deal that are not competitive will now be described. A classifier is trained for each component of the deal to indicate whether it is competitive or not. A component is not-competitive, if either its price is too high or if it should not be included in the current solution or proposal. That classifier would use attributes like those of the deal, for example, geography of the client, calendar year of the deal, competitors in the deal, classification of competitors (e.g., whether each competitor has cloud computing in-house or not, has networking or not, etc.), whether that same component appeared in each historical deal 23a-23n or not, whether that same component changed its price before or not, and/or the price of this component as well as the total value of the deal. This classifier would thus predict, for each component, whether or not it is competitive (i.e., can be left as-is or should be adjusted).

Further details of determining, for each non-competitive component, whether the price or scope should be changed or adjusted, will now be described. More particularly, the concept to be applied is that each non-competitive component might be non-competitive because: it is priced too high, given its baseline and the deal overall value; or it should not be included, and other components should be included instead. To determine that, the competitiveness of the pricing is first checked. In one embodiment, a metric may be used that determines the competiveness of the pricing of a component. In other embodiments, peer deals (deals that have similar meta-data to the present deal and a close baseline to it) may be chosen to obtain a unit price of each and a determination is made to see if the present deal is within the $x^{th}$ percentile (e.g., $50^{th}$ percentile) with regard to these deals unit costs or not. If not, the pricing is considered non-competitive and vice-versa. Of course, other determination techniques may be used, as will be appreciated by those skilled in the art.

If the price turns out to be non-competitive, changing the price is recommended. If the price turns out to not be non-competitive (i.e., competitive), then it is determined that a component could be removed and replaced by other alternative components.

Further details with respect to recommending alternatives for the parts of deals identified above will now be described. For those components that turn out to not be competitive though their pricing is competitive, other alternative parts to be added are to be found and/or recommended. To do this, in an embodiment, an optimization model may be executed that: puts in consideration the client requirement and is given the alternative ways to fulfil it; puts in consideration the relationships between components (e.g., component 1 cannot exist with component 2, or if component 2 exists, component 4 has to exist); adds a constraint for not including the components identified in the previous step as non-competitive; and determines the optimal (cheapest) solution given the above constraints.

Alternatively, a machine learning recommendation may be used that recommends which solution parts should be added given the deal attributes and the historical deals with their attributes and can add a constraint to that recommender as to not add these components identified above. Of course, other techniques may be used to recommend alternative parts, as will be appreciated by those skilled in the art.

As will be appreciated by those skilled in the art, providers typically face a situation where parts of the solution turn out to not be competitive. Providers typically make this determination during negotiation. After determining that some aspect is not competitive, providers typically do what-if analyses trying to find alternative cheaper solutions for the parts of the deal identified to be too pricy. These providers then change the one or more parts to a cheaper option by way of putting some sub-services/components in-scope and others out-of-scope. Conventional techniques for performing this process may be very time consuming, expensive, and typically involve highly skilled domain experts. The system 20 advantageously provides an automated approach to cognitively identifying the components of the deal or parts and recommending alternatives. Thus, the system 20 may greatly improve competitiveness assessment of priced deals as well as winning of deals.

A method aspect is directed to a method for cognitive assessment of the competitiveness of deals. The method includes using a processor 30 to compare current deal information 32 with historical deal information 22. The historical deal information 22 is for a plurality of historical deals 23a-23n with each historical deal including at least one historical deal component 24a-24n. The at least one historical deal component 24a-24n includes a historical work scope 25a-25n and associated historical work pricing 26a-26n. The current deal information 32 includes at least one current deal component 34a-34n including a current work scope 35a-35n and associated current work pricing 36a-36n. The method further includes using the processor 30 to use machine learning 39 to determine whether the at least one current deal component 34a-34n is non-competitive based upon the historical deal information 22, and for a non-competitive current deal component, generate an alternative current deal component 38. The alternative current deal component 38 has at least one of a different current work scope 44 and different associated current work pricing 45.

A computer readable medium aspect is directed to a computer readable medium for cognitive assessment of the competitiveness of deals. The computer readable medium includes computer executable instructions that the when executed by a processor 30 cause the processor to perform operations. The operations include comparing current deal information 32 with the historical deal information 22. The historical deal information 22 is for a plurality of historical deals 23a-23n with each historical deal including at least one historical deal component 24a-24n. The at least one historical deal component 24a-24n includes a historical work scope 25a-25n and associated historical work pricing 26a-26n. The current deal information 32 includes at least one current deal component 34a-34n that includes a current work scope 35a-35n and associated current work pricing 36a-36n. The operations also include using machine learning 39 to determine whether the at least one current deal component 34a-34n is non-competitive based upon the historical deal information 22, and for a non-competitive current deal component generating an alternative current deal component 38. The alternative current deal component 38 has at least one of a different current work scope 44 and different associated current work pricing 45.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for cognitive assessment of the competitiveness of deals comprising:
   a memory having stored thereon historical deal information for a plurality of historical deals with each historical deal comprising at least one historical deal component, the at least one historical deal component comprising a historical work scope and associated historical work pricing; and
   a processor cooperating with the memory and configured to
      compare current deal information with the historical deal information, the current deal information comprising at least one current deal component, the at least one current deal component comprising a current work scope and associated current work pricing,
      use machine learning to determine whether the at least one current deal component is non-competitive based upon the historical deal information, wherein using machine learning includes cognitively identifying and assessing the current deal components for determining competitiveness of the current deal information, and
      for a non-competitive current deal component generate an alternative current deal component, the alternative current deal component having at least one of a different current work scope and different associated current work pricing.

2. The system of claim 1 wherein the at least one historical deal component comprises a plurality of historical deal components; and wherein the at least one current deal component comprises a plurality of current deal components.

3. The system of claim 1 wherein the processor is configured to use machine learning with a machine learning classifier.

4. The system of claim 1 wherein the historical information for each historical deal further comprises at least one historical deal attribute; wherein the current deal information further comprises at least one current deal attribute.

5. The system of claim 3 wherein the at least one historical deal attribute comprises at least one of a historical deal geographic location, a historic deal time, historical deal client metadata, and historical deal competitor metadata; and wherein the at least one current deal attribute comprises at least one of a current deal geographic location, a current deal time, current deal client metadata, and current deal competitor metadata.

6. The system of claim 1 wherein the processor is configured to use machine learning to first attempt a lowered current work pricing for the alternative current deal component prior to attempting a reduced current work scope for the alternative current deal component.

7. The system of claim 1 wherein the processor is configured to compare the current work pricing to a pricing threshold.

8. The system of claim 1 wherein the alternative current deal component comprises a deleted current deal component.

9. The system of claim 1 wherein the processor is configured to determine the alternative work component also based upon an optimization model.

10. The system of claim 9 wherein the optimization model is based upon a constraint for not including the non-competitive deal component.

11. The system of claim 9 wherein the optimization model is configured to determine a lowest value alternative deal component.

12. The system of claim 1 wherein the processor is configured to use machine learning to generate the alternative current deal component, wherein the at least one current deal component is determined to be non-competitive where the associated current work pricing is greater than a predetermined threshold and/or the at least one current deal component should not be included in the current deal information.

13. The system of claim 1 wherein the historical and current deal information comprises respective historical and current information technology (IT) service contract information, wherein the service contract information comprises at least some components which are sub-services, each sub-service having a current work scope and associated current work pricing.

14. A method for cognitive assessment of the competitiveness of deals comprising:
   using a processor and associated memory to
      compare current deal information with historical deal information, the historical deal information being for a plurality of historical deals with each historical deal comprising at least one historical deal component, the at least one historical deal component comprising a historical work scope and associated historical work pricing, the current deal information comprising at least one current deal component, the at least one current deal component comprising a current work scope and associated current work pricing,
      use machine learning to determine whether the at least one current deal component is non-competitive based upon the historical deal information, wherein using machine learning includes cognitively identifying and assessing the current deal components for determining competitiveness of the current deal information, and
      for a non-competitive current deal component generate an alternative current deal component, the alternative current deal component having at least one of a different current work scope and different associated current work pricing.

15. The method of claim 14 wherein using machine learning comprises using machine learning with a machine learning classifier, wherein the at least one current deal component is determined to be non-competitive where the associated current work pricing is greater than a predetermined threshold and/or the at least one current deal component should not be included in the current deal information.

16. The method of claim 14 wherein the historical information for each historical deal further comprises at least one historical deal attribute; and wherein the current deal information further comprises at least one current deal attribute.

17. The method of claim 15 wherein the at least one historical deal attribute comprises at least one of a historical deal geographic location, a historic deal time, historical deal client metadata, and historical deal competitor metadata; and wherein the at least one current deal attribute comprises at least one of a current deal geographic location, a current deal time, current deal client metadata, and current deal competitor metadata.

18. A computer readable medium for cognitive assessment of the competitiveness of deals, the computer readable medium comprising computer executable instructions that when executed by a processor cause the processor to perform operations, the operations comprising:
   comparing current deal information with the historical deal information, the historical deal information being for a plurality of historical deals with each historical deal comprising at least one historical deal component, the at least one historical deal component comprising a historical work scope and associated historical work pricing, the current deal information comprising at least one current deal component, the at least one current deal component comprising a current work scope and associated current work pricing;
   using machine learning to determine whether the at least one current deal component is non-competitive based upon the historical deal information, wherein using machine learning includes cognitively identifying and assessing the current deal components for determining competitiveness of the current deal information; and
   for a non-competitive current deal component generating an alternative current deal component, the alternative current deal component having at least one of a different current work scope and different associated current work pricing.

19. The computer readable medium of claim 18 wherein the machine learning is used with a machine learning classifier, wherein the at least one current deal component is determined to be non-competitive where the associated current work pricing is greater than a predetermined threshold and/or the at least one current deal component should not be included in the current deal information.

20. The computer readable medium of claim 18 wherein the historical information for each historical deal further comprises at least one historical deal attribute; and wherein the current deal information further comprises at least one current deal attribute.

* * * * *